US009262897B2

(12) United States Patent
Anegawa et al.

(10) Patent No.: US 9,262,897 B2
(45) Date of Patent: Feb. 16, 2016

(54) IMAGE INFORMATION MANAGEMENT SYSTEM

(75) Inventors: Takehiko Anegawa, Tokyo-to (JP); Yoshihiro Yano, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 1364 days.

(21) Appl. No.: 11/914,479

(22) PCT Filed: May 16, 2006

(86) PCT No.: PCT/JP2006/309690

§ 371 (c)(1), (2), (4) Date: Nov. 15, 2007

(87) PCT Pub. No.: WO2006/123629

PCT Pub. Date: Nov. 23, 2006

(65) Prior Publication Data

US 2009/0027496 A1 Jan. 29, 2009

(30) Foreign Application Priority Data

May 16, 2005 (JP) ................................ 2005-142313

(51) Int. Cl.
*H04N 7/18* (2006.01)
*G08B 13/196* (2006.01)
*G07C 9/00* (2006.01)

(52) U.S. Cl.
CPC ........ *G08B 13/1961* (2013.01); *G07C 9/00087* (2013.01); *G08B 13/19602* (2013.01); *G08B 13/19673* (2013.01)

(58) Field of Classification Search
CPC ...................................................... H04N 7/181
USPC .......................................................... 348/143
See application file for complete search history.

(56) References Cited

U.S. PATENT DOCUMENTS 5,095,196 A 3/1992 Miyata
2001/0031072 A1* 10/2001 Dobashi ............. G06K 9/00228 382/118
2004/0008114 A1* 1/2004 Sawyer .................. G01S 7/003 340/572.1
2005/0055582 A1 3/2005 Bazakos et al.
2006/0106930 A1* 5/2006 Shaffer .................. H04L 67/18 709/224

FOREIGN PATENT DOCUMENTS

CN 1130331 A 9/1996
JP 09-198577 7/1997

(Continued)

OTHER PUBLICATIONS

European Search Report; EP 06 74 6404.

*Primary Examiner* — Andy Rao
*Assistant Examiner* — Joel Mesa
(74) *Attorney, Agent, or Firm* — Ladas & Parry LLP

(57) ABSTRACT

An image information management system includes: a reading device which reads unique information from a storage medium in which the unique information is stored; an imaging device which automatically starts shooting a video at a time of detecting a change of a picture image in an image area; and a processing device which includes a database which receives the unique information read by the reading device and the image information shot by the imaging device and associates the unique information and the image information to store the unique information and the image information. The processing device includes a control unit which associates the unique information and the image information to store the unique information and the image information in the database in a case of receiving the unique information and the image information, and which associates the image information and identification information indicating that no unique information is received to store the image information and the identification information in the database in a case of receiving only the image information from the imaging device and no unique information from the reading device.

1 Claim, 7 Drawing Sheets

(56) References Cited

FOREIGN PATENT DOCUMENTS

| | | |
|---|---|---|
| JP | 10-222773 | 8/1998 |
| JP | 11-313310 | 11/1999 |
| JP | 2001-167306 | 6/2001 |
| JP | 2001-302133 | 10/2001 |
| JP | 2004-005511 | 1/2004 |
| JP | 2004-030022 | 1/2004 |
| JP | 2005-051302 | 2/2005 |

* cited by examiner

FIG. 7

| EMPLOYEE ID NUMBER | NAME | DEPARTMENT (dept) | CAMERA NUMBER | CAMERA SETTING PLACE | IMAGED TIME | IMAGED INFORMATION |
|---|---|---|---|---|---|---|
| d15612 | TARO NIPPON | 1st SALES dept | 1 | HEAD OFFICE 5th FLOOR ENTRANCE | 3 Dec 2004 8:10-11:50 | |
| d21463 | HANAKO TOKYO | GENERAL SERVICE dept | 2 | HEAD OFFICE 5th FLOOR COPY MACHINE | 3 Dec 2004 9:15-9:18 | |
| 0 | | | 1 | HEAD OFFICE 5th FLOOR ENTRANCE | 3 Dec 2004 9:50-9:53 | |
| d21551 | ICHIRO SHINJUKU | ENGINEERING dept | 8 | FACTORY 1st FLOOR COPY MACHINE | 4 Dec 2004 10:05-10:10 | |
| 0 | | | 6 | HEAD OFFICE 2nd FLOOR COPY MACHINE | 5 Dec 2004 11:32-11:40 | |
| d03142 | JIRO OTSUKA | PLANNING dept | 12 | PLANNING dept BUILDING 4th FLOOR PLANNING dept | 6 Dec 2004 9:10-12:10 | |
| | | | | | | |

IMAGE INFORMATION MANAGEMENT SYSTEM

TECHNICAL FIELD

The present invention relates to an image information management system capable of efficiently searching image information shot by an imaging device such as a security camera.

BACKGROUND TECHNIQUE

Conventionally, a suspicious individual is imaged with using an imaging device such as a security camera in order to use it for security or as strong evidential information for identifying a criminal person.

As a system with using the security camera, there is known such a system that a predetermined place is imaged with using the security camera at any time and its image information is stored as a picture so that a criminal behavior is confirmed by displaying the recorded image information on a display in a case of a crime and/or an accident. In addition, there is known a suspicious individual imaging system (see Patent References-1 to 4, for example), in which a suspicious individual intrusion detector is provided in advance in the system, and in a case of intrusion of a suspicions individual, the suspicious individual is imaged by operating a security camera.

Patent Reference-1: Japanese Patent Application Laid-open under No. 9-198577

Patent Reference-2: Japanese Patent Application Laid-open under No. 10-222773

Patent Reference-3: Japanese Patent Application Laid-open under No. 2001-302133

Patent Reference-4: Japanese Patent Application Laid-open under No. 2004-5511

However, in such a case that the criminal person is the trusted employee, like the office crime, since he or she is not imaged by the suspicious individual intrusion detector as the suspicious individual, the imaging system of the suspicious individual is useless.

Thus, in this case, such a time-consuming work that the predetermined place is imaged with using the security camera at any time and the picture of the suspicious employee is searched out of history information of the image information and confirmed becomes necessary.

There is disclosed a system capable of starting shooting by the imaging device by reading the ID information stored on the ID card owned by the employee with using a reader/writer, and capable of searching the image information on the basis of the ID information by associating the image information shot by the imaging device with the ID information and storing them.

However, when the suspicious person having no ID card illegally enters the room, the imaging device does not shoot the video, which becomes problematic for security reason.

DISCLOSURE OF INVENTION

Problem to be Solved by the Invention

The present invention has been achieved in order to solve the above problem. It is an object of this invention to provide an image information management system which stores image information of a suspicious person having no ID card and a user of electronics in a storage unit to efficiently search the image information.

Means for Solving the Problem

According to one aspect of the present invention, there is provided an image information management system including: a reading device which reads unique information from a storage medium in which the unique information is stored; an imaging device which automatically starts shooting a video at a time of detecting a change of a picture image in an image area; and a processing device which includes a database which receives the unique information read by the reading device and the image information shot by the imaging device and associates the unique information and the image information to store the unique information and the image information, wherein the processing device includes a control unit which associates the unique information and the image information to store the unique information and the image information in the database in a case of receiving the unique information and the image information, and which associates the image information and identification information indicating that no unique information is received to store the image information and the identification information in the database in a case of receiving only the image information from the imaging device and no unique information from the reading device.

The above image information management system associates the image information and the identification information indicating that no unique information is received and stores the image information and the identification information in the database, when the processing device does not receive the unique information of the storage medium from the reading device. Therefore, there is such an effect that only the image information of the suspicious person having no storage medium can be efficiently searched from the database.

In a manner of the above image information management system, the imaging device may include a storage unit which stores electronic identification information of specifying electronics existing in an image area shot by the imaging device, and a unit which transmits, to the processing device, not only the image information but also the electronic identification information at a time of transmitting the image information to the processing device.

In this manner, there is such an effect that, since not only the image information but also the electronic identification information is transmitted to the processing device at the time of transmitting the image information to the processing device, the image information management system can efficiently search the image information of the electronic user from the database based on the electronic identification information at the time of searching the image information.

In another manner of the above image information management system, the processing device may include a unit which displays the unique information and the image information associated and stored in the database, as a same picture image.

In this manner, since the image information management system can display the unique information and the image information on the display unit, there is such an effect that the illegal action is immediately confirmed, even when the stolen storage medium of the other person is illegally used.

In still another manner of the image information management system, the processing device may include an abnormal state informing unit which informs an abnormal state in a case of receiving only the image information from the imaging device and no unique information from the reading device.

In this manner, the abnormal state is informed to the processing device in the case of receiving only the image information from the imaging device and no unique information from the reading device. Thus, the image information management system of the present invention has such an effect that the illegal action can be immediately confirmed.

BRIEF DESCRIPTION OF THE DRAWINGS

FIG. 7 is a diagram showing an example of information registered in an image information database of the image information search system according to the embodiment of the present invention.

BRIEF DESCRIPTION OF THE REFERENCE NUMBER

Figure 1:
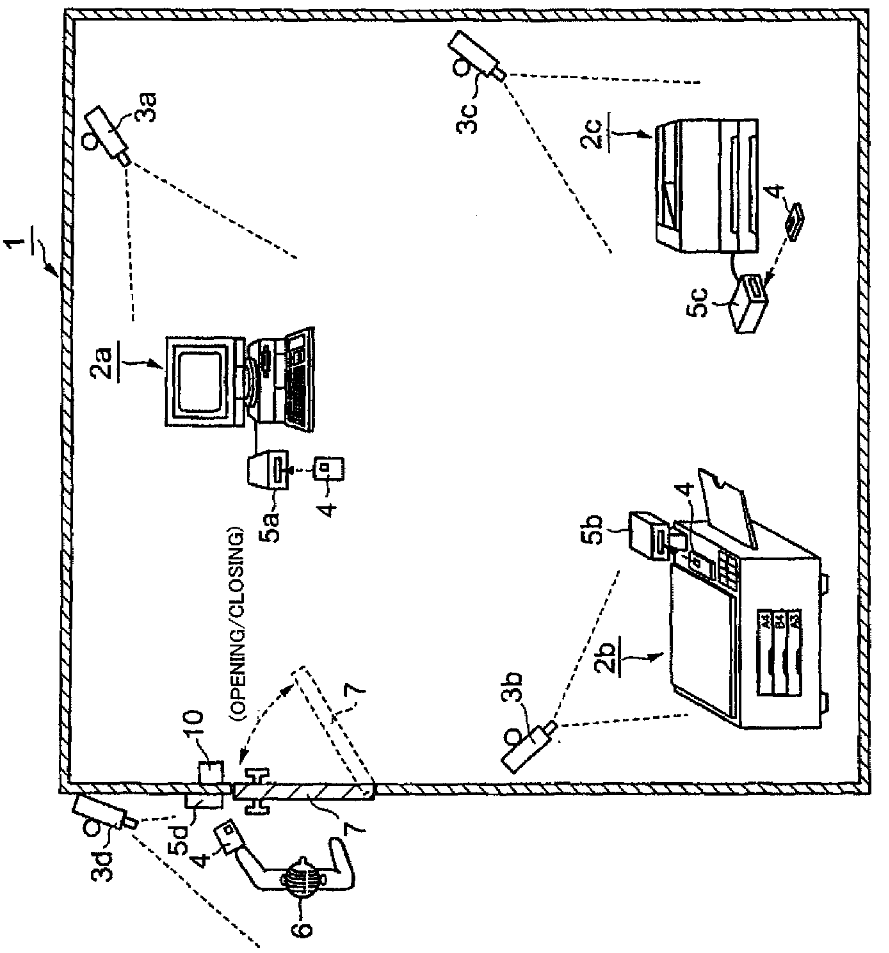
FIG. 1 is a diagram for schematically explaining a configuration of an image information search system according to an embodiment of the present invention.

1 Room in which room entrance is managed
2 Electronics
2*a* Personal computer
2*b* Copy machine
2*c* Printer
3 Imaging device
3*a*,3*b*,3*c*,3*d* Security cameras
4 ID card
4*a*,4*b* Card base materials
5 Reading device
5*a*,5*b*,5*c*,5*d* Card readers
6 Electronics user
7 Opening/closing door
8 Communication circuit
9 Processing device
10 Locking management device
11 Non-contact IC tag
12 IC module
13 Base material
15 Conductive member
16C Coil connection terminal
17 IC chip

DETAILED DESCRIPTION OF THE PREFERRED EMBODIMENTS

Now, a description will be given of the image information search system according to an embodiment of the present invention in details, with reference to the attached drawings.

Figure 2:
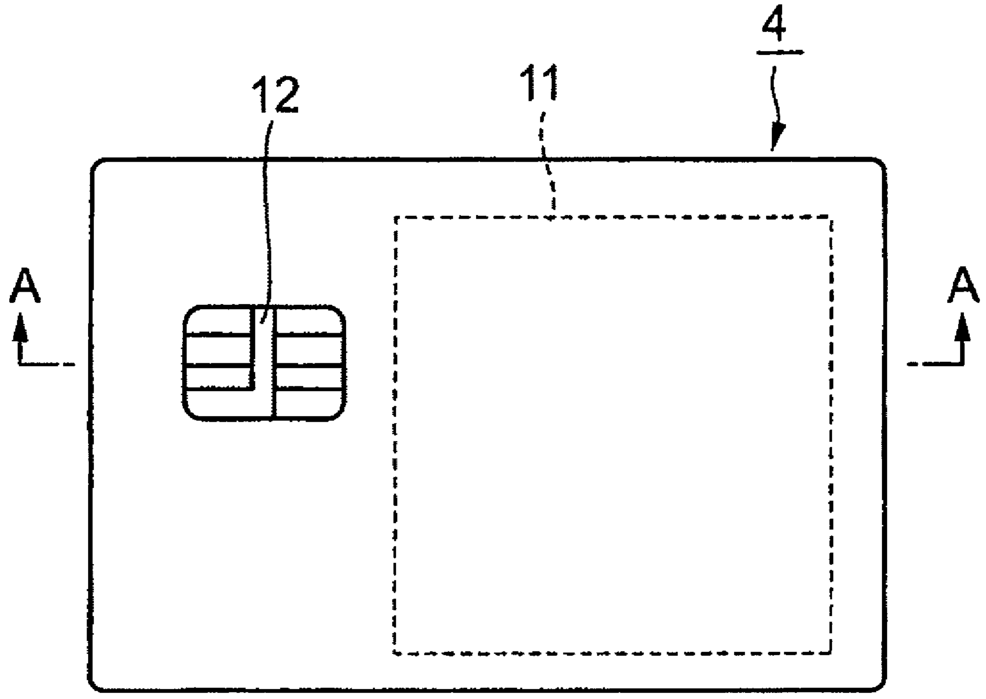
FIG. 2 is a plan view of an ID card used in the image information search system according to the embodiment of the present invention.
Figure 3:
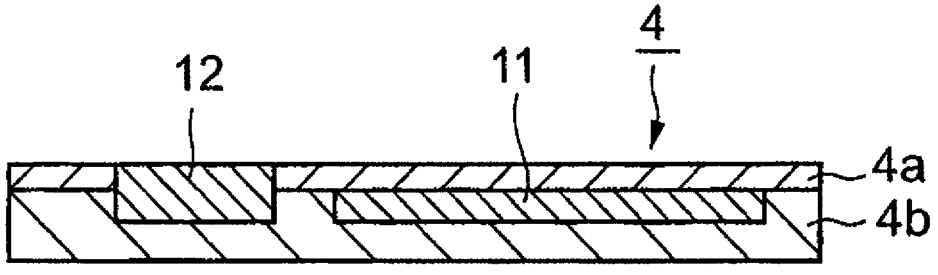
FIG. 3 is a cross-sectional view which is cut by an A-A line shown in FIG. 2.
Figure 4:
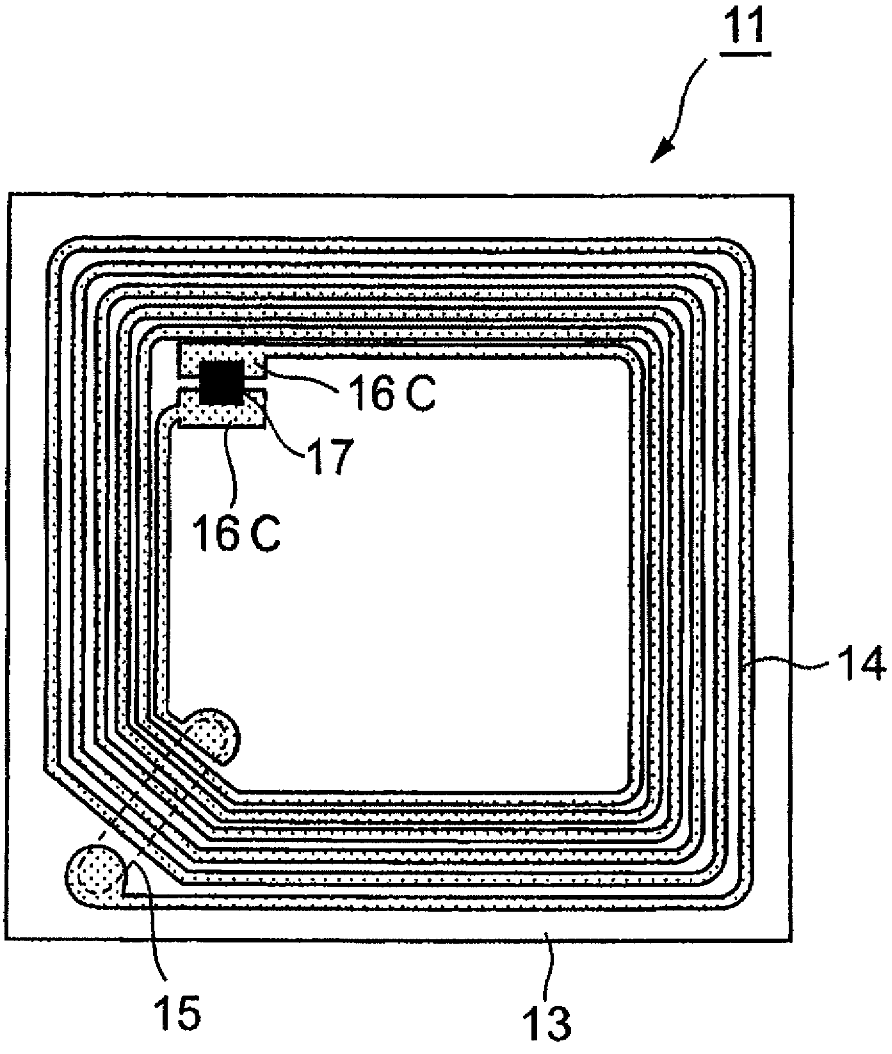
FIG. 4 is a plan view of a non-contact IC tag arranged on the ID card.
Figure 5:
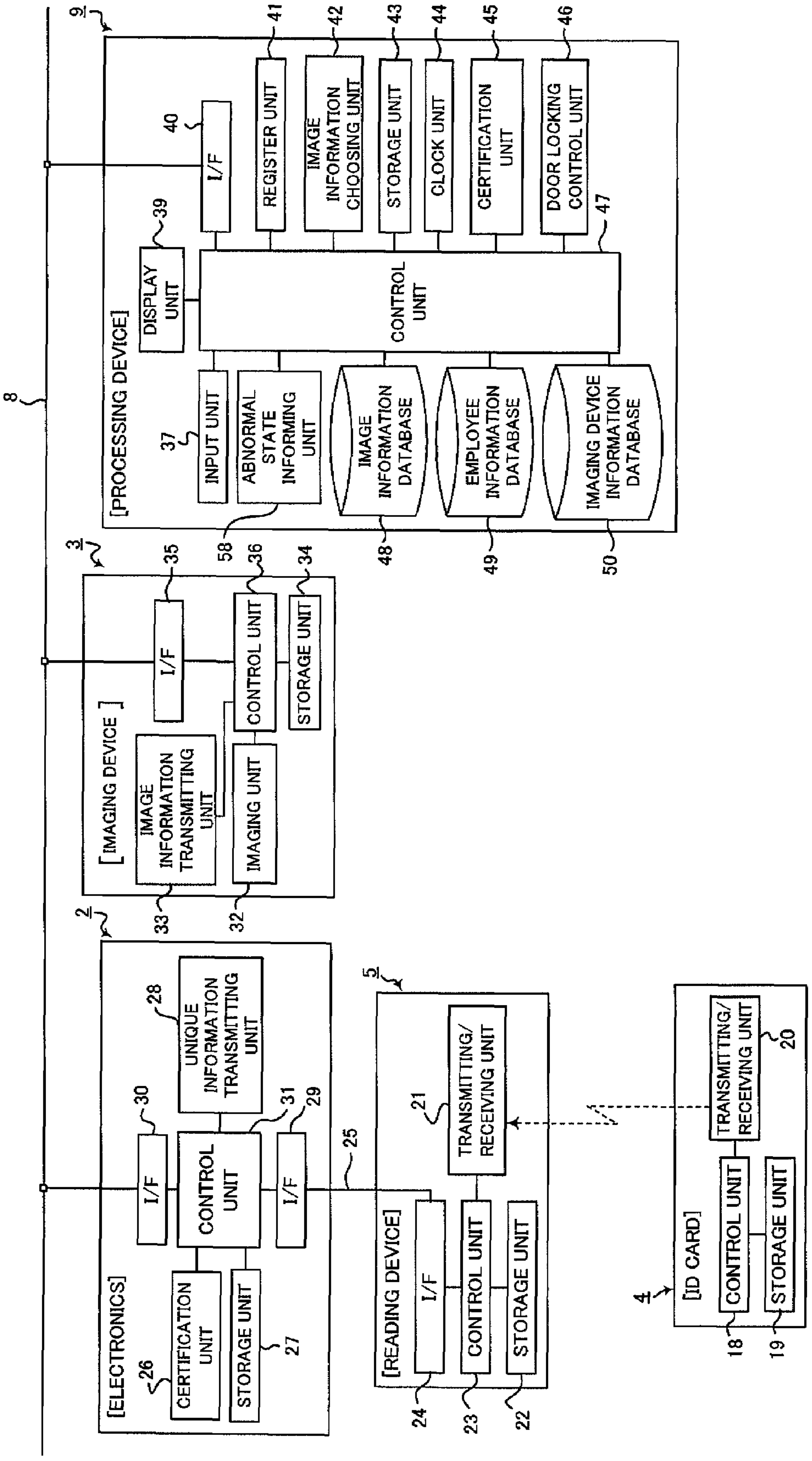
FIG. 5 is a system block diagram of the image information search system according to the embodiment of the present invention.
Figure 6:
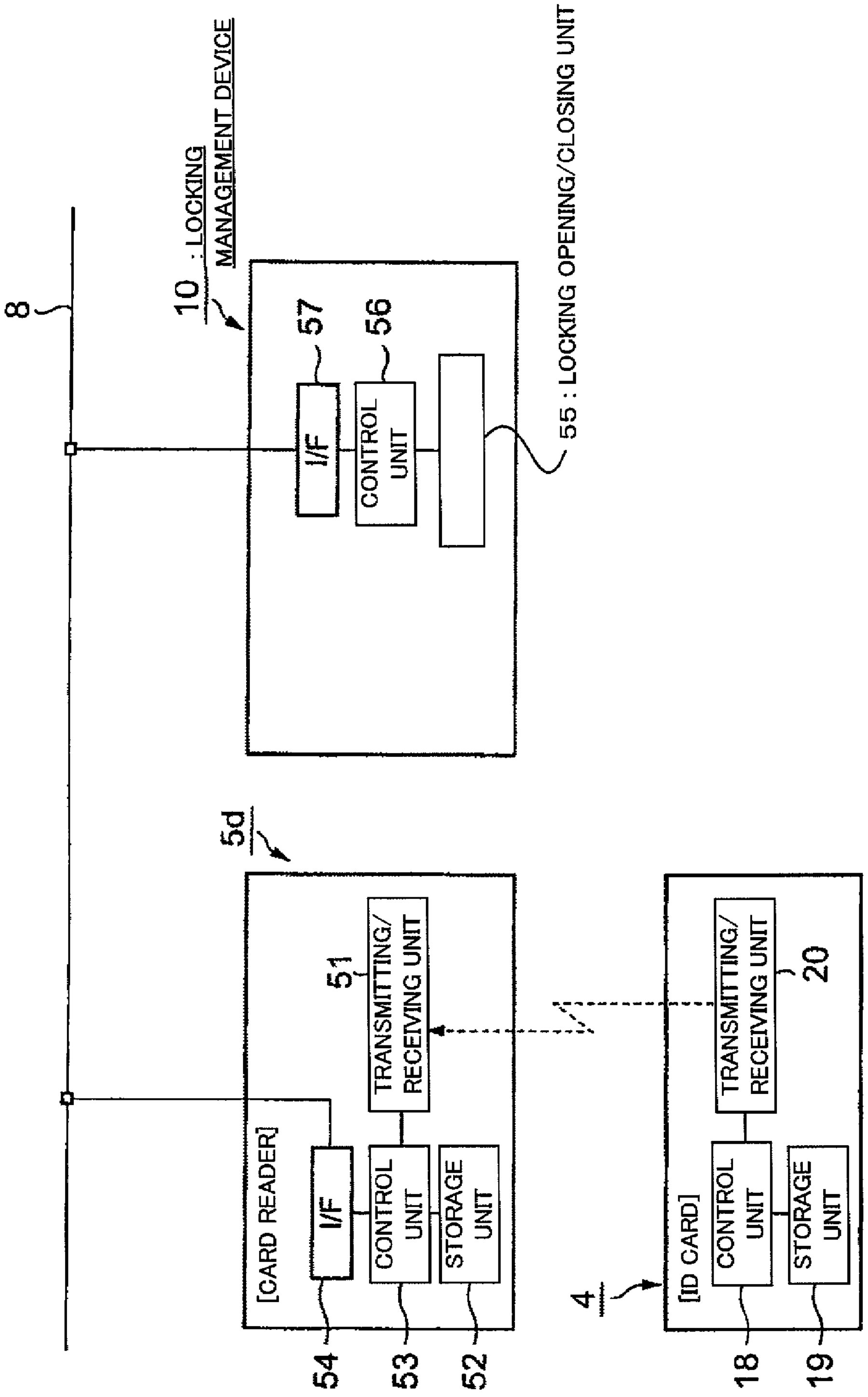
FIG. 6 is a system block diagram of the image information search system according to the embodiment of the present invention.
Figure 8:
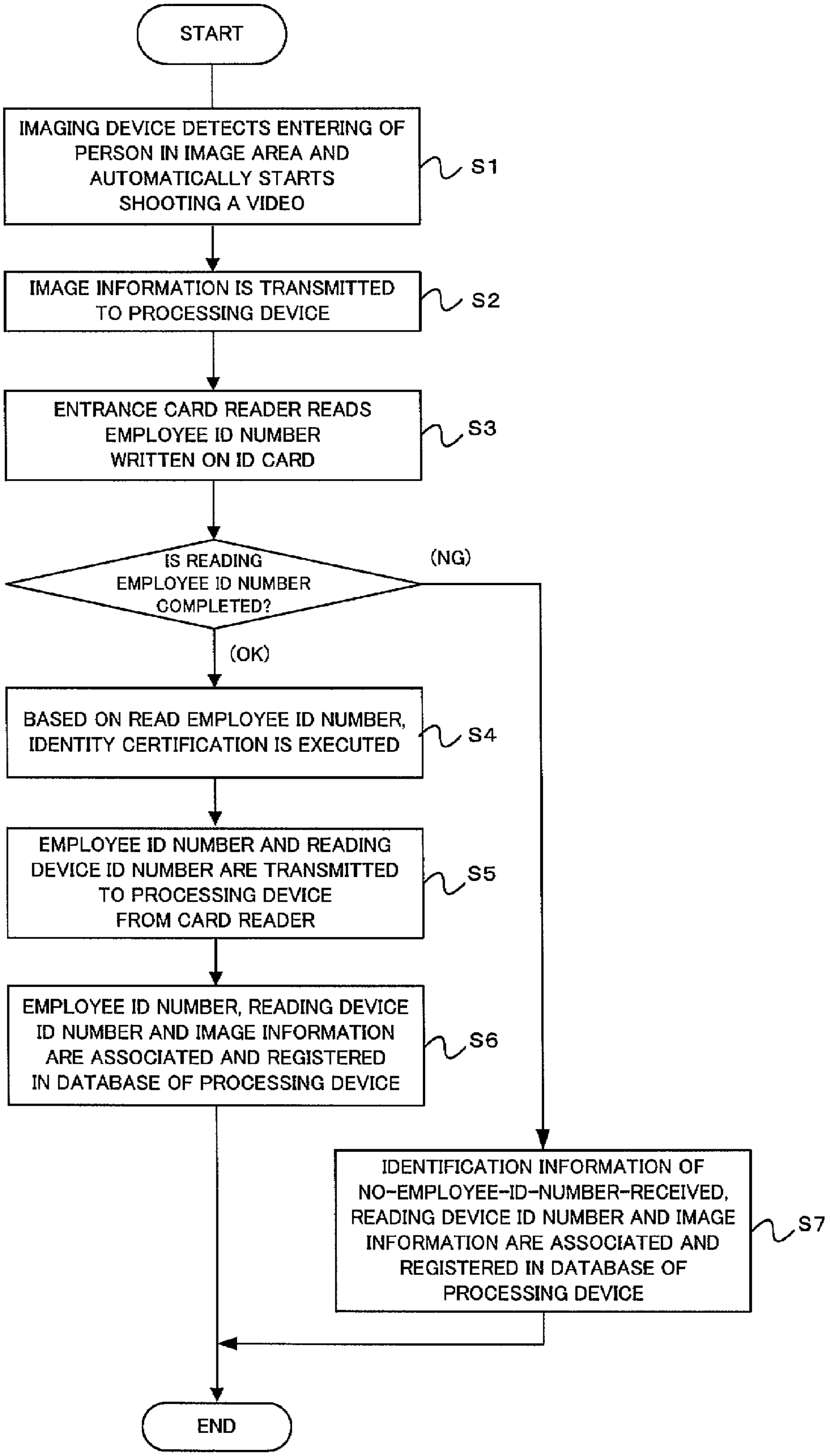
FIG. 8 is a flow chart showing a procedure of the image information search system according to the embodiment of the present invention.

FIG. 1 is a diagram for explaining the outline of the configuration of the image information search system according to the embodiment of the present invention. FIG. 2 is a plan view of the ID card used in the image information search system according to the embodiment of the present invention. FIG. 3 is a cross-sectional view which is cut by the cutting line A-A shown in FIG. 2. FIG. 4 is a plan view of the non-contact IC tag provided on the ID card. FIG. 5 and FIG. 6 are system block diagrams of the image information search system according to the embodiment of the present invention. FIG. 7 is a table showing an example of information registered in the image information database of the image information search system according to the embodiment of the present invention. FIG. 8 is a flowchart showing a procedure of the image information search system according to the embodiment of the present invention.

As shown in FIG. 1, in the image information search system according to the embodiment of the present invention, a room 1 in which room entrance is managed includes plural electronics 2 including a personal computer 2*a*, a copy machine 2*b*, and a printer 2*c*, and an imaging device 3 including security cameras 3*a*, 3*b* and 3*c* for shooting a video of a user 6 of the electronics 2.

Moreover, card readers 5*a*, 5*b* and 5*c* being reading devices 5 are connected to each of the electronics 2.

The card readers 5*a*, 5*b* and 5*c* have functions to read an employee ID number being the unique information stored on the ID card 4 being the storage medium owned by the user 6.

At an entrance/exit of the room 1, an opening/closing door 7 whose locking is managed by the ID card 4 is provided. A card reader 5*d* for reading the employee ID number being the unique information stored on the ID card 4 is provided on the outer side of the entrance/exit of the room 1.

A security camera 3*d* for shooting a video of the person entering the room 1 from the entrance/exit thereof is further provided, and can shoot the entering person.

As shown in FIG. 5 and FIG. 6, the electronics 2 such as the personal computer 2*a*, the copy machine 2*b* and the printer 2*c*, the imaging device 3 such as the card reader 5*d*, the security cameras 3*a*, 3*b*, 3*c* and 3*d*, and the locking management device 10 are connected to the processing device 9 including the computer by the communication line 8.

The ID card 4 being the storage medium may be a storage medium: capable of storing the unique information capable of specifying the user of the electronics; and capable of making the reading device read the unique information. This point is not particularly limited. In the shown recording medium, such a case that the non-contact IC card having an IC module for contact is used is shown as an example.

As shown in FIG. 2 to FIG. 4, the ID card 4 has such a configuration that a non-contact IC tag 11 is integrated inside the card base materials 4*a* and 4*b* and an IC module 12 is embedded.

The non-contact IC tag 11 is also referred to as “non-contact data carrier” or “RFID”, and a transmitting/receiving unit 20 including a coil pattern is formed on a base material 13 made of plastic, as shown in FIG. 4. The non-contact IC tag 8 forms a resonant circuit with using a coil and a capacitative element to receive and transmit an acoustic wave of a constant frequency.

Additionally, as another system, power transmission and data transmission may be performed by electromagnetic induction of a carrier wave from a reader/writer. Generally, frequency bands of 135 kHz (medium wave), 13.56 MHz and 2.45 GHz (micro wave) are used.

In the case of the shown example, the transmitting/receiving unit 14 including the coil pattern forms a jumping circuit on the rear side of the base material 13 by a continuity member 15, and is connected to a bump on the rear side of an IC chip 17 by a coil connection terminal 16C. The IC chip 17 includes a control unit 18 serving as a CPU and a storage unit 19 serving as a memory. The storage unit 19 registers the employee ID number being the unique information.

In the shown example, the capacitative element is integrated in the IC chip 17. The non-contact IC tag 11 is formed by forming the coil pattern by the photo etching or the etching after resist print of metallic foil such as aluminum foil laminated on a resin base material, mounting the IC chip 17, and providing a protective coating. The size can be a size equal to or smaller than 30 mm×30 mm.

The resin base material 13 used for the non-contact IC tag 11 can be made of various kinds of materials such as PET, polypropylene, polyethylene, polystyrene and nylon. Moreover, the resin base material 13 may be made of paper. Though thickness thereof can be 15-300 μm, 20-100 μm is preferred in consideration of the strength, the processing work property and the cost. Though copper foil, aluminum foil and iron foil can be used as the metallic foil, the aluminum foil is preferred in consideration of the cost and the processing property, and the thickness about 6-50 μm is preferred.

In reading the information recorded on the non-contact IC tag 11, the card reader being the reading device sends a resonating calling signal to the non-contact IC tag 11, and reads a response signal from the non-contact IC tag 11. In addition, the card reader reads the information recorded in the memory of the IC chip 17 of the non-contact IC tag 11. Thereby, reading the information is executed.

Next, a description will be given of the configuration of the image information search system according to this embodiment of the present invention in details, with reference to FIG. 5 and FIG. 6.

First, a reading device 5 provided in the electronics 2 includes a transmitting/receiving unit 21, a storage unit 22, a control unit 23 and an interface (I/F) 24.

The transmitting/receiving unit 21 receives the employee ID number being the unique information from the transmitting/receiving unit 20 of the ID card 4 without contact.

The storage unit 22 includes management number being the identification information predetermined for managing each of the electronics 2, and a control program. The control program is programmed to transmit the employee ID number being the unique information received by the transmitting/receiving unit 21 and the management number to the electronics 2 via a communication wire 25.

The electronics 2 include a certification unit 26, a storage unit 27, a unique information transmitting unit 28, interfaces (I/F) 29 and 30 and a control unit 31.

Based on the employee ID number being the unique information received from the reading device 5, the certification unit 26 determines whether or not the user is the person permitted to use the electronics 2. The determination method is to certificate the user in a case that, by a collation process with collation information stored in the storage unit 27, a collation result of coincidence of both of the information is obtained.

The electronics 2 are in a locked state and unusable until the certification in the certification unit 26 is approved. When the certification is approved, the locking is released, and the electronics 2 become usable.

When the locking of the electronics 2 is released and the electronics 2 become usable, the unique information transmitting unit 28 transmits the employee ID number being the unique information received from the reading device 5 to the processing device 9 via the communication line 8.

The imaging device 3 includes an imaging unit 32 having a detection function to automatically start shooting a video at the time of detecting the change of the picture image in the image area, an image information transmitting unit 33, a storage unit 34, an interface (I/F) 35 and a control unit 36.

A specific image area capable of shooting the video is set to the imaging unit 32 in advance, and the shooting area and the vicinity of the electronics can be shot.

The storage unit 34 stores the control program and the management number being the identification information of the imaging device 3.

The image information transmitting unit 33 has a function to transmit the image information shot by the imaging unit 32 and the management number to the processing device 9 via the communication circuit 8.

The electronics which can be shot by the imaging device 3 may be one of the electronics, or the image area may be set in order to shoot the plural electronics.

The processing device 9 includes an input unit 37, a display unit 39, an interface (I/F) 40, a register unit 41, an image information choosing unit 42, a storage unit 43, a clock unit 44, a certification unit 45, a door locking control unit 46, a control unit 47, an image information database 48, an employee information database 49, an imaging device information database 50 and an abnormal state informing unit 58.

The employee ID number which is set for each employee, and information associated with the employee ID number, e.g., the name, the post, the department, the phone number and the company-joining date, are registered in the employee information database 49 as the employee information.

In order to specify the electronics which can be imaged by each of the imaging devices 3, information obtained by associating the management number being the identification information of each of the imaging devices 3 and the management number of the electronics which can be imaged by each of the imaging devices 3 is registered in the imaging device information database 50.

The register unit 41 associates the employee ID number being the unique information received from the electronics 2, the image information received from the imaging device 3, the clock information and the management number of the imaging device via the communication line 8, and registers them in the image information database 48.

Further, based on the employee ID number being the unique information received from the electronics 2, the register unit 41 chooses the preset information out of the employee information registered in the employee information database 49, and associates it with the employee ID number to register them in the image information database 48.

In addition, the clock unit 25 of the processing device 9 makes it clear what time the employee ID number being the unique information is received from the electronics 2 via the communication line 8. The employee ID number and the image information received from the electronics 2 are registered in the image information database 48 so that the time of receiving of the employee ID number and the imaged time information of the image information received from the electronics 2 coincide with each other. Namely, the employee specified by the employee ID number is seen in the picture imaged at the substantially same time as that of reading the employee ID number in the reading device 5.

FIG. 7 shows an example of the information registered in the image information database 48. As shown in FIG. 7, as the information registered in the image information database 48, the name, the department, the camera number, the camera setting place, the imaged time and the image information, associated with the employee ID number being the unique information, are registered. Therefore, when only the picture of the specific employee is chosen and seen, the image information of the employee can be easily displayed and seen on the display unit, based on the employee ID number and the name being the unique information.

In addition, the display unit 39 has a function to display the unique information and the image information associated with each other and stored in the image information database 48 of the processing device 9 as the same picture image.

Thereby, even when someone steals the storage medium of the other person and illegally uses it, by seeing and confirming the unique information and the image information displayed on the display unit 39, it becomes possible to immediately confirm whether or not the illegal action is executed.

In such a case that the employee ID number is not read by the card readers 5*a*, 5*b* and 5*c* being the reading devices 5, instead of the employee ID number, "0" is registered as the identification information indicating that no employee ID number being the unique information is received. Thus, when "0" is registered in the space for originally registering the employee ID number, such a probability that a suspicious person is shot is predicted high. Therefore, when "0" is registered, the name and department of the employee are not registered.

Moreover, the certification unit 45 has a function to execute the certification process of the employee ID number being the unique information received from the card reader 5*d* used at the time of entering of the room 1. When the certification is approved, the door locking control unit 46 transmits the instruction signal for releasing the locking of the opening/closing door to the locking management device 10 via the communication line 8.

Additionally, in such a case that the image information of the specific employee is displayed on the display unit 39 to be seen, the image information choosing unit 42 chooses the image data associated with the employee ID number registered in the image information database 48 out of the employee ID number being the unique information inputted from the input unit 37 by the browser to be registered, based on the employee ID number being the unique information. Then, the image information choosing unit 42 displays the unique information and the image information on the display unit 39 as the same picture image.

The abnormal state informing unit 58 has a function to inform the abnormal state in such a case that only the image information is received from the imaging device 3 and no unique information is received from the reading device. The function of informing the abnormal state is executed by various kinds of methods such as making an alarm sound, transmission of alarm information via e-mail and alarm display on the display unit.

As shown in FIG. 6, the card reader 5*d* provided on the outer side of the entrance/exit of the room 1 and the locking management device 10 for managing the locking state of the opening/closing door 7 whose locking is managed are connected to the communication line 8.

The card reader 5*d* includes a transmitting/receiving unit 51, a storage unit 52, a control unit 53 and an interface (I/F) 54. The transmitting/receiving unit 51 receives the employee ID number being the unique information from the transmitting/receiving unit 20 of the ID card 4 without contact.

The storage unit 52 includes the management number capable of specifying the card reader 5*d* and the control program. The control program is programmed to transmit the employee ID number being the unique information received by the transmitting/receiving unit 51 and the management number to the processing device 9 via the communication line 8.

The locking management device 10 includes a locking opening/closing unit 55 for varying the opening/closing state of the opening/closing door 7, a control unit 56 and an interface (I/F) 57.

When receiving the instruction signal for releasing the locking of the door from the processing device 9 via the communication line 8, the locking opening/closing unit 55 releases the door locking, which makes it possible for the employee to enter the room. Thereby, it can be prevented that a person having no ID card 4, such as a third person other than the employee, enters the room.

Next, a description will be given of the procedure of the image information management system according to the embodiment of the present invention, with reference to a flow chart shown in FIG. 6.

On detecting the change of the image by the entering of the person in the image area, the imaging device 3 set at the entrance of the gate automatically starts shooting the video (step S1). Then, the imaging device 3 continues shooting the video for a predetermined time period from such a state that the imaging device 3 does not detect the change of the picture image in the image area, and automatically finishes shooting the video. The image information shot by the imaging device 3 is transmitted to the processing device 9 (step S2).

The employee ID number being the unique information stored on the ID card 4 owned by the employee is read by the card reader 5*d* being the reading device provided at the entrance of the gate (step S3). In such a case that the employee ID number is read, the identity certification is subsequently executed based on the employee ID number read by the card reader 5*d* being the reading device (step S4).

When the identity certification is approved, the locking of the entrance door is released, and the room becomes enterable. At the same time, the employee ID number read by the card reader 5*d* being the reading device and the reading device ID number capable of specifying the card reader 5*d* being the reading device are transmitted to the processing device 9 from the card reader 5*d* being the reading device (step S5).

When receiving the employee ID number and the reading device ID number, the processing device 9 extracts the name and the department from the information registered in the employee information database 49 based on the received employee ID number by the register unit, and associates them with the employee ID number to register them into the image information database 48. At the same time, based on the reading device ID number, the processing device 9 associates the image information received from the imaging device with the camera number, the camera setting place and the imaged time to register them (step S6).

On the other hand, in such a case that the processing device 9 does not receive the employee ID number from the imaging device 3 within the predetermined time period from the time of receiving the image information from the imaging device 3, the processing device 9 associates the image information and the reading device ID information and stores them in the image information database 48 being a storage unit of the processing device 9. At the same time, the processing device 9 associates the identification information of no-employee-ID-number-received indicating that no employee ID number is received, and stores them (step S7). The identification information indicating that no employee ID number is received may be optionally determined, and may be indicated as "0", for example.

By the above-mentioned process, the image information of the suspicious individual having no ID card 4 can be associated with the identification information indicating that no employee ID number is received to be stored. When only the image information of the suspicious individual is extracted and checked, the image information can be easily extracted from the identification information.

In the above embodiment, such a case that the employee ID card owned by the employee is used as the storage medium is explained. However, the storage medium is not limited to the ID card. Namely, the storage medium is applicable to various kinds of storage media owned by the person, such as a ticket and a room key used in a hotel.

INDUSTRIAL APPLICABILITY

The present invention provides a technique of executing use management of electronics and limitation of illegal use thereof, room entrance management, entrance management and visiting management with using a storage medium such as an IC card. Thus, the present invention is usable for various kinds of management such as use management of office facilities and security management of building.

The invention claimed is:

1. An image information management system connected to electronic devices, comprising:

a storage medium having person ID information stored thereon;

a reading device provided in the electronic device and the reading device reads the person ID information from the storage medium;

a plurality of imaging devices, each comprising:

an imaging unit that shoots a user of the electronic device to produce an image information and automatically starts shooting at a time of detecting a change of the image in an image area;

a storage unit that stores an imaging device identification information and the imaging device identification information identifies the imaging device; and a unit that transmits the imaging device identification information and the image information shot by the imaging unit to a processing device; and the processing device comprising:

a receiving unit that receives the person ID information from the reading device, and receives the image information shot by the imaging device and the imaging device identification information from the imaging device;

an imaging device information database that stores the imaging device identification information, in association with an electronic device identification information, the electronic device identification information identifies an electronic device arranged within a shooting area of the imaging device, for each of the plurality of imaging devices;

an image information database that associates and stores the person ID information, the image information, the imaging device identification information, and the position of the imaging device corresponding to the imaging device identification information;

a display unit that displays the person ID information and the image information associated and stored in the image information database as a same picture image;

a control unit that specifies the electronic device identification information associated with the imaging device identification information received from the imaging device by referring to the imaging device information database, and associates and stores the person ID information, the image information, the imaging device identification information, and the position of the imaging device corresponding to the imaging device identification information into the image information database when the receiving unit receives the image information and the imaging device identification information from the imaging device and receives the person ID information from the reading device, and associates and stores the image information, identification information indicating no person ID information is received, the imaging device identification information, and the position of the imaging device corresponding to the imaging device identification information into the image information database when the receiving unit receives only the image information and the imaging device identification information from the imaging device and receives no person ID information from the reading device; and an abnormal state informing unit that informs an abnormal state when the receiving unit receives only the image information from the imaging device and receives no person ID information from the reading device, wherein the control unit stores the identification information indicating no person ID information is received, instead of the person ID information, into the image information database when the receiving unit receives only the image information and the imaging device identification information from the imaging device and receives no person ID information from the reading device.

* * * * *